Aug. 11, 1964  H. W. DIETERT  3,143,777

MOLDABILITY CONTROLLER

Filed Aug. 21, 1961

INVENTOR.
HARRY W. DIETERT
BY Whittemore
Hulbert & Belknap
ATTORNEYS

# United States Patent Office 3,143,777
Patented Aug. 11, 1964

3,143,777
MOLDABILITY CONTROLLER
Harry W. Dietert, Kerrville, Tex., assignor to Harry W.
Dietert Co., Detroit, Mich., a corporation of Michigan
Filed Aug. 21, 1961, Ser. No. 132,901
15 Claims. (Cl. 22—89)

The invention relates to material conditioning and refers more specifically to an improved method of and means for controlling the moldability of foundry sand or the like.

In the past conditioning of granular material such as foundry sand and the like has usually been accomplished by controlling the moisture content thereof and compensating for variable parameters such as temperature and material composition. It has however been discovered that the direct testing of the desired ultimate property of the granular material, such as moldability, is more accurate and reliable than the measuring of any individual constituent of the granular material such as the moisture contained therein as an indication of the desired ultimate property.

Further it is desirable to test the moldability of a sample of granular material as soon after the sample is provided as possible to prevent change of the physical properties of the sample. This is especially true in dealing with hot foundry sand wherein evaporation of moisture therefrom may be relatively rapid. Prior direct moldability testers have been deficient in the speed at which they operate to determine the moldability of a sample of granular material. Thus, in the past, a substantial lag has been present between the time of providing a sample of granular material and control of an additive added to the granular material in response to determined properties of the granular material.

It is therefore an object of the present invention to provide a more rapid method of determining the moldability of granular material.

Another object is to provide improved means for more rapidly determining the moldability of granular material.

Another object is to provide a method of determining the moldability of granular material including the steps of throwing a sample of granular material against a perforated plate and computing the relative percentage of the granular material which is passed through the perforated plate and which does not pass therethrough.

Another object is to provide apparatus for controlling the moldability of granular material including a rapidly moving conveyor, means for feeding a sample of granular material the moldability of which is to be controlled onto the conveyor, a rotating perforated plate at the discharge end of the conveyor against which the granular material travelling on the conveyor is thrown, and a balance located beneath the rotating perforated plate positionable in accordance with the percentage of granular material in the sample passing through the perforated plate.

Another object is to provide apparatus as set forth above and further including means operably associated with the balance to complete an electric circuit when a predetermined percentage of granular material in a sample passes through the perforated plate indicating a desired moldability of the granular material whereby the addition of the additive to the granular material is halted.

Another object is to provide an improved method of conditioning granular material to provide a desired moldability thereof comprising mixing the granular material while adding an additive thereto, providing a continuous sample of the granular material, throwing the continuous sample of granular material against a rotating perforated plate, indicating the percentage of the granular material in the sample passing through the rotating plate, producing a signal in response to a predetermined indicated percentage of granular material passing through the plate, and controlling the addition of the additive to the granular material in response to the developed signal.

Another object is to provide a method of and means for controlling the moldability of granular material which is simple, economical and efficient.

Other objects and features of the invention will become apparent as the description proceeds, especially when taken in conjunction with the accompanying drawings, illustrating a preferred embodiment of the invention, wherein.

One embodiment of the present invention will now be considered.

Figure 1:
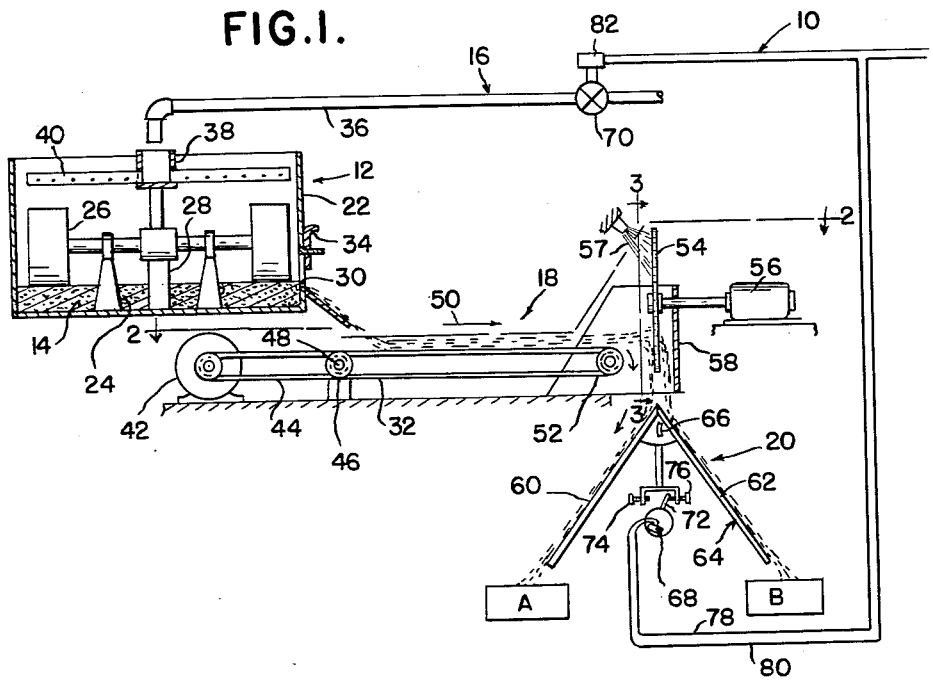
FIGURE 1 is a diagrammatic representation of a throwing type of moldability controller for granular material constructed in accordance with the invention.
Figure 2:
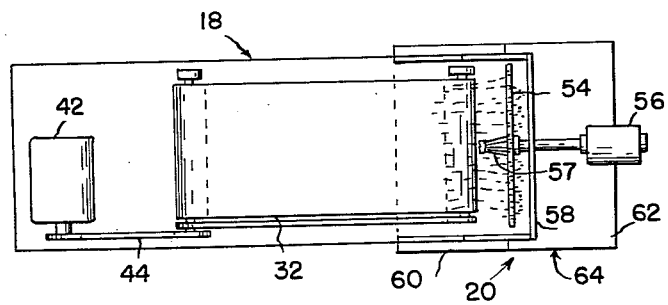
FIGURE 2 is a partial section of the moldability controller illustrated in FIGURE 1 taken substantiallly on the line 2—2 in FIGURE 1.
Figure 3:
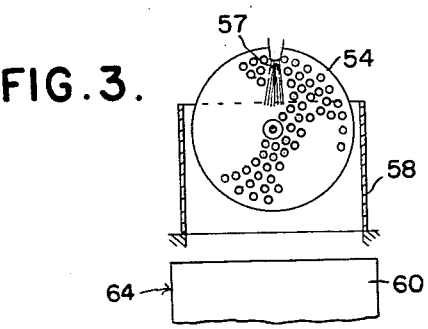
FIGURE 3 is a partial section of the moldability controller illustrated in FIGURE 1 taken on the line 3—3 in FIGURE 1.

The moldability controller 10 illustrated in FIGURE 1 includes the mulling apparatus 12 for mixing granular material such as foundry sand 14 and a suitable additive such as water passing to the muller 12 through the additive supply apparatus 16. The moldability controller 10 further includes the separating apparatus 18 operable to receive a continuous sample of granular material from the muller 12 and to separate it into two portions in accordance with the moldability thereof. Additive control apparatus 20 is also provided as part of the moldability controller 10 and functions to separately store the granular material separated by the separating apparatus 18 in different bins in accordance with the moldability of the granular material and to stop the addition of additive to the muller 12 when the granular material reaches a predetermined moldability.

More specifically the muller 12 comprises a cylindrical container 22 into which the granular material 14 to be conditioned is placed for mulling by the scrapers 24 and rollers 26 mounted on shaft 28 which may be rotated by convenient means (not shown). An outlet 30 for a sample of the granular material 14 is provided in the container 22 as shown best in FIGURE 1 to permit a substantially constant volume of granular material to be deposited on conveyor 32 of the separating apparatus 18 during rotation of the scrapers 24 and rollers 26. The quantity of granular material fed to the conveyor 32 may be controlled by convenient means such as the sliding gate 34.

In conditioning the granular material 14 in the muller 12 a suitable additive, such as water, is fed thereto through the pipe 36 of the additive supply apparatus 16. Additive supply apparatus 16 further includes the reservoir 38 in communication with the perforated hollow tubes 40 secured to the rotating shaft 28 of the muller 12. Water passed through pipe 36 is discharged into reservoir 38 and during rotation of the scrapers 24 and rollers 26 of the muller 12 is substantially uniformly metered to the granular material 14 through tubes 40.

Separating apparatus 18 besides including the high speed conveyor 32 mentioned above comprises the drive motor 42 and continuous drive belt 44 which drive the conveyor 32 at a relative high speed through sprockets 46 and shaft 48. Granular material such as foundry sand deposited on the conveyor 32 from the muller 12 will be rapidly moved in the direction of arrow 50 and will be thrown from the end 52 of the conveyor 32 with substantial force so as to impact against the perforated circular plate or screen 54 which is supported and rotated by the motor 56 immediately adjacent the end 52 of the conveyor 54 as shown best in FIGURE 1.

The perforated plate 54 is rotated at a slow speed of for example 30 r.p.m. to maintain the plate clean. Brush 57 may also be provided in conjunction with the perforated circular plate to more positively clean the plate during rotation thereof.

The shield 58 is operable to guide the granular material thrown from the end of the conveyor 32 onto the opposite sides 60 and 62 of the balance 64 depending on whether the granular material has passed through the perforations of the plate 54 or has been prevented from passing through the perforations.

The percentage of granular material passing through the rotating plate 54 will be a measure of the moldability of the granular material in accordance with the following formulae wherein B is the weight of the granular material sample passing through the plate 54 and A is the weight of material prevented from passing through the plate as more fully set forth in the commonly owned copending patent application Serial No. 83,074, filed January 16, 1961:

$$\text{Moldability} = \frac{B}{A+B} \cdot 100$$

$$\text{Toughness} = \frac{A}{A+B} \cdot 100$$

Thus the moldability of the granular material 14 may be determined in accordance with the above formulae by weighing the portions of a discrete sample of granular material from muller 12 separated by separating apparatus 18 and collected in the bins A and B illustrated in FIGURE 1.

The additive control apparatus 20 includes the balance which may be supported for pivoting on a frictionless pivot 66 such as a flat resilient band by convenient means (not shown). The mercury switch 68 and the solenoid operated valve 70 in pipe 36 are also included in the additive control apparatus 20.

The mercury switch 68 is conventional and is rotatably mounted by convenient means (not shown) so that on engagement of the lever 72 thereof by adjustable abutment 74 or 76 the switch will be rotated in opposite directions to either make a connection between the electric conductors 78 and 80 to energize the solenoid 82 or break such connection to deenergize the solenoid 82. The abutments 74 and 76 are adjustable so that the position of the balance 64 on energizing and deenergizing the solenoid 82 by means of the mercury switch 68 may be varied.

In operation granular material 14 to be conditioned is placed in the container 22 with the solenoid actuated valve 70 open so that a conditioning additive is added to the granular material 14. With the scrapers 24 and rollers 26 of the muller 12 rotating a substantially continuous sample of the granular material 14 is discharged through opening 30 thereof onto the fast moving conveyer 32.

The sample of granular material is thus moved in the direction of arrow 50 and is thrown off the end 52 of the conveyer 32 whereupon it impacts against the rotating perforated plate 54. A portion of the sample of granular material passes through the plate 54 while another portion thereof is stopped in its movement in the direction of arrow 50 by the perforated circular plate 54. The portions of the granular material sample are directed onto opposite sides of the balance 64 by means of the guide 58 and are deposited in the separate bins A and B.

The material passing over the opposite sides of the balance 64 will cause movement of the balance 64 about the frictionless pivot in accordance with the percentage thereof which has passed through the rotating perforated plate. With movement of the balance 64 about the frictionless pivot 66 the mercury switch 68 will be rotated to complete a circuit through the solenoid 82 over conductors 78 and 80 when the granular material has reached a predetermined moldability at which time the solenoid valve 70 is closed to halt the addition of additive to the container 22.

The drawings and the foregoing specification constitute a description of the improved moldability controller in such full, clear, concise and exact terms as to enable any person skilled in the art to practice the invention, the scope of which is indicated by the appended claims.

What I claim as my invention is:

1. Apparatus for separating granular material comprising a conveyer for receiving a sample of granular material, means for rapidly moving the conveyer for throwing the sample of the granular material from an end of the conveyer, a substantially flat vertically extending rotatable perforated plate positioned adjacent the end of the conveyer and extending transversely thereof against which the sample of granular material is thrown for separating the sample of granular material in accordance with the moldability thereof and means for rotating the perforated plate.

2. Structure as claimed in claim 1 and further including means for cleaning the perforated plate while it is rotating.

3. Granular material conditioning apparatus comprising a muller for mixing the granular material and an additive, means positioned adjacent the muller for adding an additive to the granular material, a conveyer positioned to receive a sample of the granular material from the muller, means for substantially constantly feeding a sample of granular material from the muller to the conveyer, means for rapidly moving the conveyer to throw the sample of the granular material from an end of the conveyer, a substantially flat vertically extending perforated plate positioned adjacent the end of the conveyer and extending transversely thereof against which the sample of granular material is thrown for separating the sample into portions in accordance with the moldability thereof, and means for controlling the addition of additive to the granular material responsive to the relative weight of the separated portions.

4. Structure as claimed in claim 3 wherein said means for feeding a sample of granular material from the muller to the conveyer comprises an opening in the container near the bottom thereof, rotating scrapers and rollers in the container, and a sliding gate positioned over said opening for controlling the magnitude of the sample of granular material fed to the conveyer.

5. Structure as claimed in claim 3 wherein the perforated plate is rotatable, and means for rotating the perforated plate.

6. Structure as claimed in claim 3 and further including means for cleaning the perforated plate while it is rotating.

7. Structure as claimed in claim 3 wherein said means for controlling the addition of additive to the granular material responsive to the relative weights of the separated portions of the sample of granular material includes a balance positioned beneath said perforated plate to receive the portion of the sample of granular material passing through the perforated plate on one side and the portion of the sample of granular material not passing through the perforated plate on the other side whereby the position of the balance is determined by the moldability of the sample of granular material.

8. Structure as claimed in claim 7 and further including a shield extending about the perforated plate for deflecting both portions of the sample of granular material onto said balance.

9. Structure as claimed in claim 7 wherein said means for controlling the addition of additive to the granular material further includes a solenoid operated valve in the additive supply line, and a mercury switch rotatably mounted adjacent the balance and actuated thereby on movement of the balance indicating a predetermined granular material moldability to complete an electric circuit to energize said solenoid operated valve.

10. Structure as claimed in claim 9 and further including adjustable stops carried by the balance for actuating said switch whereby the moldability of the granular material in the container when the addition of additive thereto is stopped by energization of the solenoid actuated valve may be varied.

11. A method of controlling the moldability of granular material comprising adding an additive to the granular material while it is being mixed, continuously throwing a sample of the granular material at a vertically extending perforated plate for dividing the sample into two portions in accordance with the moldability thereof, and stopping the addition of the additive to the granular material in response to the portions of the granular material attaining a predetermined relative weight.

12. A method of controlling the moldability of granular material comprising adding an additive to the granular material while it is being mixed, continuously throwing a sample of the granular material at a vertically extending perforated plate for dividing the sample into two portions in accordance with the moldability thereof, deflecting the two portions of the granular material onto opposite sides of a balance to produce movement of the balance in accordance with the relative weight of the two portions, and stopping the addition of additive to the granular material in response to the balance moving into a predetermined position.

13. Granular material conditioning apparatus comprising a muller for mixing granular material and a liquid additive, a continuous conveyer positioned adjacent the muller, means for feeding a substantially constant quantity of granular material from the muller onto the conveyer, means for rapidly advancing the granular material on the conveyer toward one end thereof, a substantially flat rotatable, vertical perforated disc extending transversely of and positioned immediately adjacent said one end of the conveyer, means for rotating the disc, a shield extending around the disc for deflecting granular material thrown from the end of the conveyer and passing through the perforations in the disc and the granular material striking the disc, a balance positioned beneath the disc and shield for receiving the granular material passing through the disc on one side thereof and the granular material striking the disc on the other side thereof whereby the position of the balance is determined by the relative portions of granular material passing through and striking the disc and means responsive to the position of the balance for controlling the addition of additive to the granular material within the muller.

14. The method of controlling the moldability of granular material comprising mixing granular material with an additive, feeding a substantially constant sample of the mixed granular material and additive onto a moving conveyer, rapidly transporting the granular material on the conveyer to one end thereof for throwing the granular material from said one end of the conveyer, separating the granular material thrown from the end of the conveyer into portions striking and passing through a rotating vertical perforated disc extending transversely of and positioned adjacent the end of the conveyer from which the granular material is thrown, deflecting the portions of the sample of granular material passing through and striking the plate onto opposite sides of a balance for positioning the balance and controlling the addition of misture to the granular material in accordance with the position of the balance.

15. A method of determining the moldability of granular material comprising throwing a sample of the granular material at a vertically extending perforated plate for dividing the sample into a portion passing through the perforated plate and a portion which does not pass through the perforated plate and deflecting the portions of the granular material onto the opposite sides of a balance to produce movement of the balance in accordance with the relative weight of the portions of granular material and indicative of the moldability of the granular material.

References Cited in the file of this patent

UNITED STATES PATENTS

| 2,189,711 | Eigenbrot | Feb. 6, 1940 |
| 2,854,714 | Dietert | Oct. 7, 1958 |
| 2,940,154 | Howard | June 14, 1960 |